United States Patent [19]

Stockton et al.

[11] Patent Number: 4,891,987
[45] Date of Patent: Jan. 9, 1990

[54] MAGNETIC LINKAGE FOR BOURDON TUBE GAUGES

[76] Inventors: William E. Stockton, 16721 SW. 299th St., Homestead, Fla. 33030; Harold E. Stockton, 24 Veenstra Rd., Houston, Tex. 77022

[21] Appl. No.: 275,943

[22] Filed: Nov. 25, 1988

[51] Int. Cl.$^4$ .............................................. G01L 7/04
[52] U.S. Cl. ...................................... 73/732; 73/741
[58] Field of Search ....... 73/732, DIG. 005, 736–743; 116/204, 267, 271

[56] References Cited

U.S. PATENT DOCUMENTS

| | | | |
|---|---|---|---|
| 564,957 | 7/1896 | Hart | 73/732 |
| 898,148 | 9/1908 | Spencer | 73/732 |
| 2,578,257 | 12/1951 | Marchment | 73/DIG. 005 |
| 2,745,027 | 5/1956 | Williford, Jr. | 73/DIG. 005 |
| 3,486,479 | 12/1969 | Hartmann | 116/204 |
| 3,641,820 | 2/1972 | Bissell | 73/743 |
| 3,975,967 | 8/1976 | Conti | 73/732 |
| 4,246,796 | 1/1981 | Wetterhorn | 73/732 |
| 4,542,654 | 9/1985 | Wilson et al. | 73/732 |

FOREIGN PATENT DOCUMENTS 0838459 6/1981 U.S.S.R. ................... 73/732

OTHER PUBLICATIONS

Goitein, Instrument Practise, Sep. 1952, pp. 748–755.

Primary Examiner—Joseph A. Orsino
Assistant Examiner—Kinfe-Michael Negash
Attorney, Agent, or Firm—Erwin M. Barnett

[57] ABSTRACT

A Bourdon tube pressure gauge has a movement amplifying mechanism comprising a pinion of segment shaped permanent bar magnets extending radially and terminating at a circular edge magnetically driven by a pivotally mounted rack segment having an arcuate band of permanent bar magnets arranged in parallel alignment with polar axes extending radially of the rack and transversely of the band. One of the poles of each of the magnets of the band is located along a driving arcuate edge thereof which faces and magnetically drives the circular edge of the pinion by magnetic attraction of opposite poles. The polarity of adjacent magnets on both the pinion and rack segment is reversed providing alternate N and S poles around the pinion circular edge and along the driving edge of the band, respectively. In one form of movement, the rack segment is formed with an opening and the driving arcuate edge faces the opening in which the pinion is positioned for operative magnetic engagement between the band and pinion. In another form of movement, the pinion is positioned radially beyond the rack segment. The movement is housed in a rear compartment of the gauge which is lined with a magnetic flux barrier material.

16 Claims, 2 Drawing Sheets

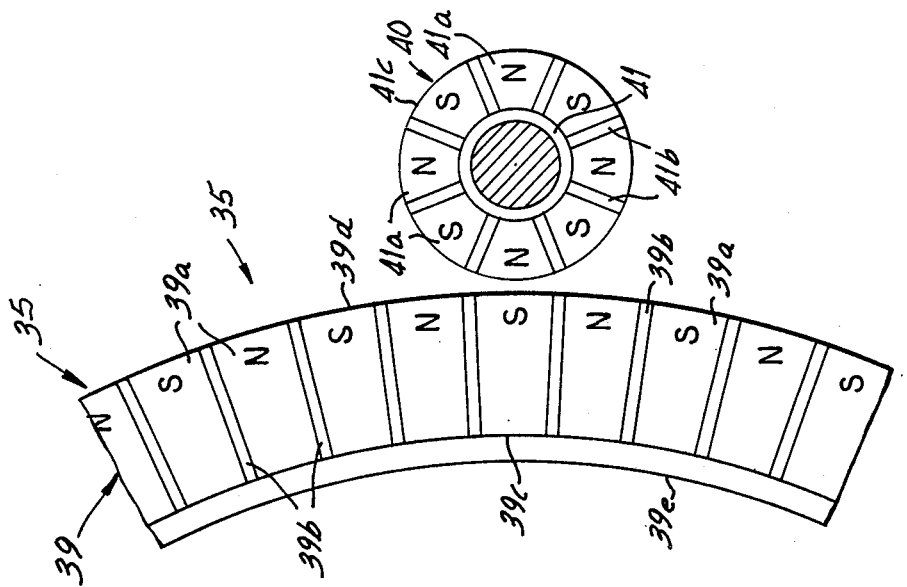
FIG-4-
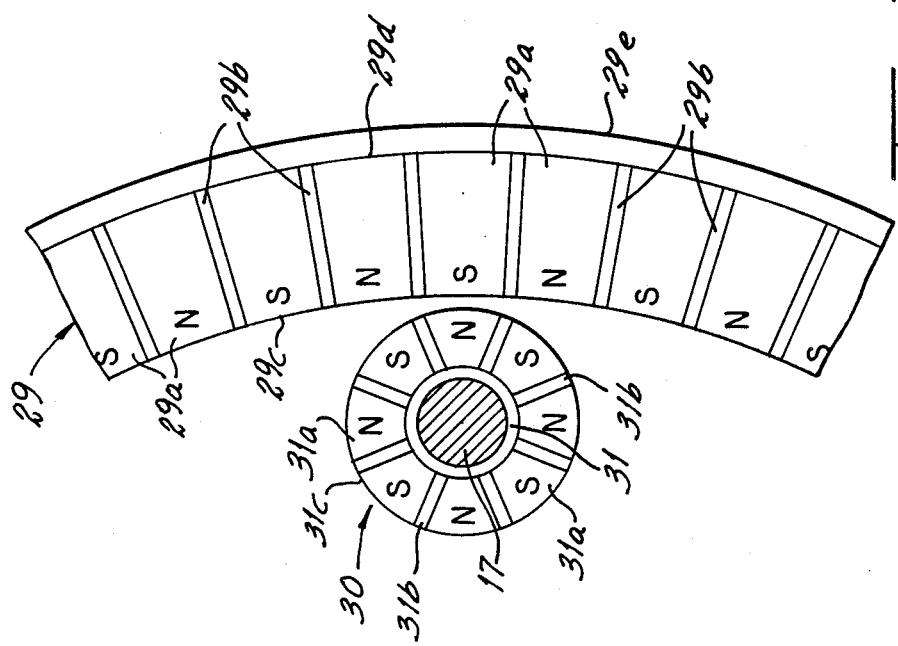
FIG-3-

MAGNETIC LINKAGE FOR BOURDON TUBE GAUGES

BACKGROUND OF THE INVENTION

1. Field of the Invention

This invention relates to improvements in pressure gauges having pressure sensitive Bourdon tubes each operatively connected by an arcuate rack and pinion linkage to its rotating pointer of the dial and more particularly is directed to a magnetic drive between the rack segment and the pinion in place of conventional gear teeth.

2. Description of the Prior Art

A representative structural arrangement of Bourdon tube pressure gauges is shown in the drawing of U.S. Pat. No. 3,975,967 in which the relatively small movement of the Bourdon tube pressure sensitive free end 29 is connected by a linkage 30 to the amplifying movement 32 for rotating shaft 34 and pointer 36. Amplifying movement 32 comprises an arcuate rack segment which, when pivoted by the movement of Bourdon tube free end 29 through an acute angle, rotates the pinion mounted to turn shaft 34 and pointer 36. Amplifying movement 32 thus rotates pointer 36 through at least one complete rotation when Bourdon tube free end 29 moves between its limits. A hair spring, operating between shaft 34 and a portion of the housing, maintains a consistent and accurate reading by pointer 36 on dial 40 by taking up any slack in the gear teeth engagement between the rack segment and pinion. This geared rack segment and pinion with or without the hair spring biasing, has proved to be the weakest component in the gauge and is responsible for most of the failures and need for repairs. The hair spring has a tendency to break when abrupt movement of the mechanism occurs due to sudden pressure changes and the broken spring catches in the gear teeth. Also, these abrupt movements cause the teeth to wear excessively.

A need, therefore, exists for an improved movement amplifying mechanism which will eliminate the above described problems and provide a more reliable guage.

SUMMARY OF THE INVENTION

Among the objects of the invention is to satisfy the hereinbefore need which will provide a movement amplifying mechanism of simple and relatively inexpensive construction readily adaptable to existing Bourdon tube pressure gauges by a minimum of modification and which will be reliable and foolproof in operation and provide accuracy of readings at least equal to and expectedly greater than those of existing gear teeth drives.

The movement amplifying mechanism comprises a pivotally mounted rack segment provided with magnetic means adapted to drive complementary magnetic means provided on a pinion which rotates the pointer, the pinion magnetic means comprising segment shaped magnets extending radially and terminating at the circular edge of the pinion. The magnetic means of the rack segment constitutes an arcuate band bordering the circumference of the rack and comprises a plurality of permanent bar magnets arranged in substantial parallel alignment with their polar axes extending radially of the rack and transversely of the band. One of the poles of each of the magnets is located along a driving arcuate edge of the band which faces and drives the circular edge of the pinion. The polarity of adjacent magnets on both the pinion and rack segment is reversed to provide alternate N and S poles around the pinion circular edge and along the driving edge of the band, respectively. The magnets of both rack and pinion are sized for registration wich each other whereby pivoting of the rack by Bourdon tube action results in accurate predetermined rotation of the pinion. A thin sheet of magnetic flux barrier material separates each of the adjacent magnets on both the rack and pinion serving to prevent dissipation of magnetic forces across the interfaces thereof.

In a preferred form of the invention, the rack segment has a sector shaped opening defined by the arcuate band and a pair of radial arms extending from the hub at which the segment pivots. The band, which is supported at opposite end by the radial arms, has an inner arcuate edge facing the opening and an outer arcuate edge forming the circumference of the rack with the aligned magnets extending therebetween. Also in the preferred form, the pinion is located in the opening so that the poles of the magnets along the inner edge of the band serve as the driving means for the pinion and the relative positions of the pinion and the arcuate band place the driving inner edge of the band in proper alignment with and slightly spaced from the driven circular edge of the pinion. A shim of soft iron extends along the outer edge of the band covering the poles of all the magnets to direct the flux toward the inner edge of the band and hence toward the poles of the magnets on the pinion for maximum magnetic attraction.

In a modified form of the invention, the rack segment, pinion and associated magnets are proportioned for locating the pinion beyond the rack segment whereby the outer edge of the band faces and drives the pinion and the shim extends along the inner edge of the band.

BRIEF DESCRIPTION OF THE DRAWINGS

FIG. 3 is an enlarged detailed fragmentary view of the rack and pinion engagement shown in FIG. 2, and FIG. 4 is a view similar to FIG. 4 but showing a modified rack and pinion engagement.

DESCRIPTION OF THE PREFERRED EMBODIMENT

Figure 1:
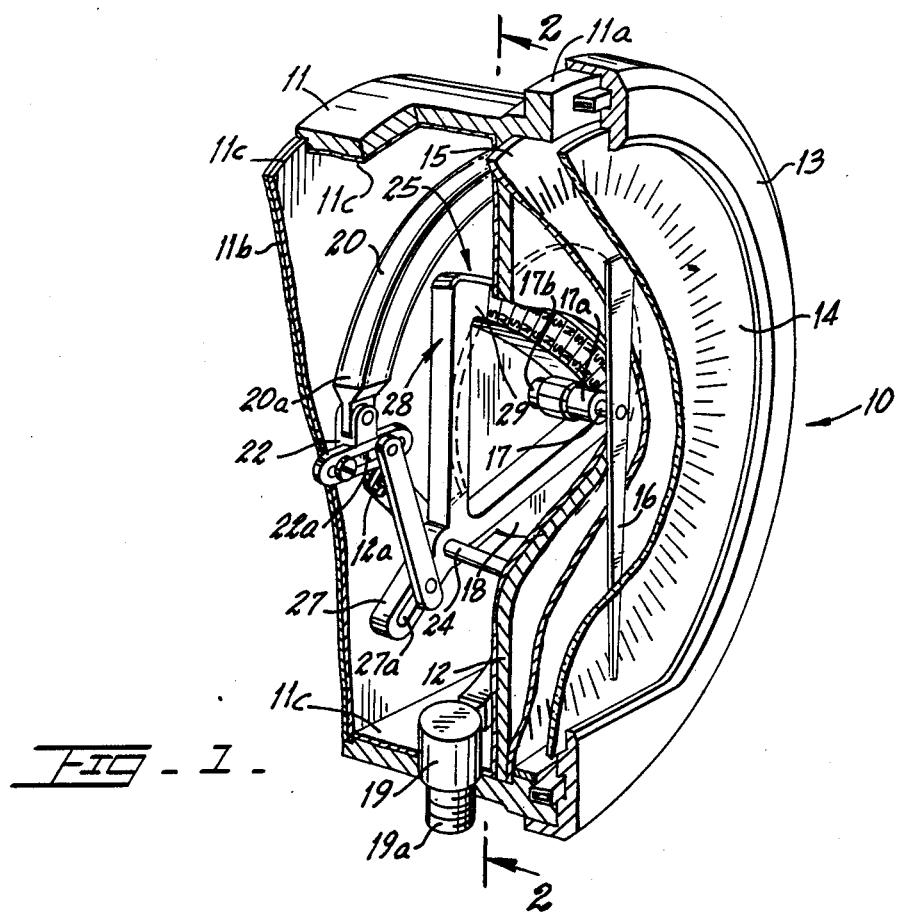
FIG. 1 is a left perspective view of a gauge embodying the invention with parts cut away to show interior construction.

Referring in detail to the drawings, 10 generally denotes the pressure gauge embodying the invention, seen in FIG. 1 to comprise a tubular casing 11 having an integrally formed transverse wall 12 dividing the casing into front and rear compartments. A portion of casing 11, projecting forwardly beyond wall 12, terminates in radial flange 11a which mounts bezel 13 for retaining a lens 14 as the see-through closure for the front compartment. The latter contains dial 15 and pointer 16 which is balanced and mounted on the end of shaft 17 projecting through wall 12.

The rear compartment houses Bourdon tube 20, which may be of any suitable construction well known in the art, a linkage 21, and the movement amplifying mechanism for pointer 16, which mechanism comprises rack segment 25 and pinion 30. Bourdon tube 20 is supported in operative position by fitting 19 which is secured to casing 11 and has a threaded end 19a extending therethrough for attachment to a suitable conduit communicating with a pressurized system to be monitored by gauge 10. A rear closure plate 11b removably attaches to the rear of casing 11.

Rack segment 25 and pinion 30 are located substantially in the plane of Bourdon tube 20, a pinion 30 being mounted on shaft 17 which extends axially of casing 11 and is suitably journaled in two spaced bearings 17a and 17b for maximum support and for ease of rotation with minimum friction. Bearing 17a journals shaft 17 at an intermediate portion thereof between pointer 16 and pinion 30 and is located in wall 12 enabling shaft 17 to extend therethrough. Bearing 17b, which terminates the rear end of shaft 17 beyond pinion 30, is carried by a support plate 18. The latter is spaced rearwardly of wall 12 and is retained in position by suitable means, herein shown as two posts 12a integrally formed with front wall 12 to extend into the rear compartment and terminating in interior threaded portions to receive anchoring screws 18a in the mounting of plate 18. A pivot pin 24, supported by and extending between wall 12 and plate 18, pivotally mounts rack segment 25 in operative relation to pinion 30.

As practiced in the art, the relatively small radial movement of the free closed end 20a of Bourdon tube 20 responsive to pressure changes within the latter is ultimately translated to rotation of shaft 17. To this end, linkage 21, connecting Bourdon tube free end 20a to rack segment 25, may be of any suitable construction, herein seen to comprise T-shaped link 22 and bar 23. Link 22 pivots freely and has an elongated slot 22a in which a pivot pin carrier 22b is adjustably mounted. Bar 23 pivots at one end on pin 22c of carrier 22b and at the opposite end carries pivot pin 23a which engages and freely slides in a slot 27a formed in radial extension 27 of rack segment 25.

Figure 2:
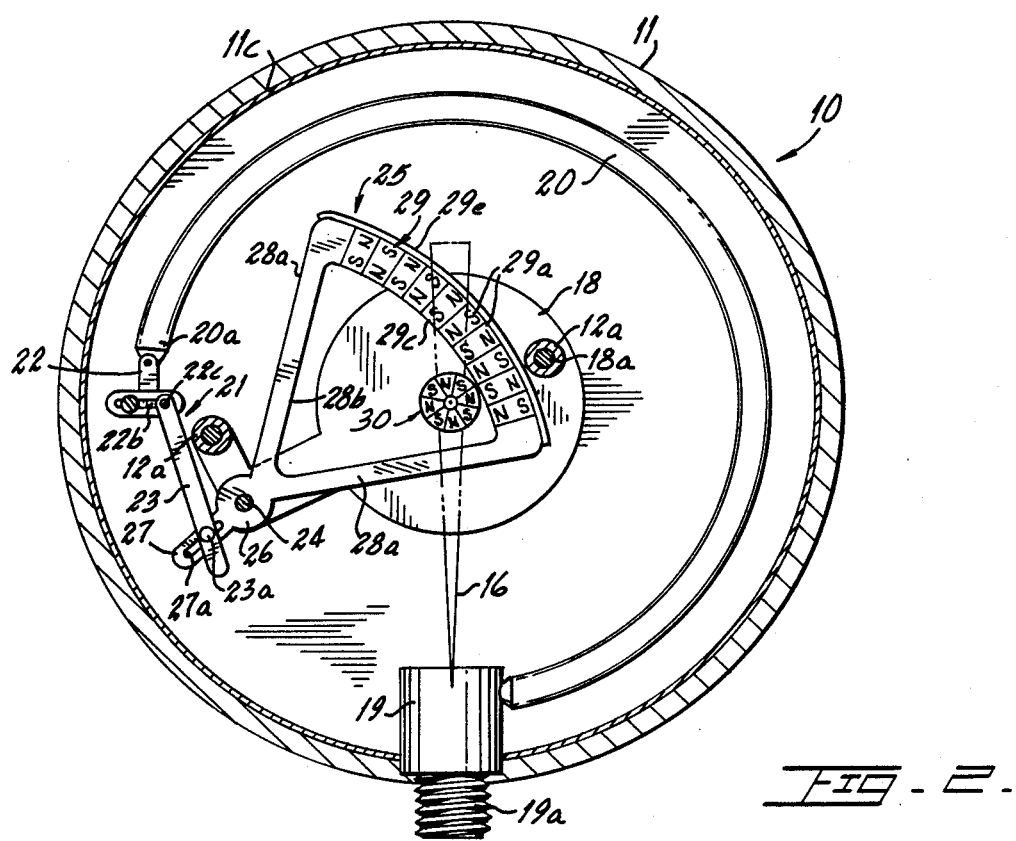
FIG. 2 is a vertical sectional taken substantially along line 2—2 in FIG. 1 showing the rack and pinion engagement.

As shown in FIGS. 2 and 3, rack segment 25 comprises a hub 26 from which radial extension 27 and sector portion 28 extend in opposite directions. Hub 26 mounts a suitable bearing for journaling rack segment 25 on pivot pin 24. Sector portion 28 comprises a pair of radially extending arms 28a supporting an arcuate band 29 extending therebetween to provide an opening 28b which likewise may be sector shaped. Sector portions 28 and opening 28b are proportioned and located by pivot pin 24 to accommodate shaft 17 and pinion 30 passing therethrough. Arcuate band 29 is formed to provide about ten bar magnets 29a arranged in substantial parallel alignment with polar axes extending radially and separated from each other by thin sheets 29b of a magnetic flux barrier material, such as lead, which may have a thickness of about 0.020 inches. The polarity of adjacent magnets 29a are reversed so that the poles bordering the interior edge 29c of band 29 are in alternating sequence as indicated in the drawings. A shim or cover 29e may be positioned to extend along the exterior edge 29d of band 29, shim 29e being made of a magnetic material, such as soft iron, which will serve to direct and intensify the magnetic flux of magnets 29a toward magnets 31a of pinion 30.

Pinion 30 comprises a plurality of bar magnets 31a separated by barrier sheets 31b. Magnets 31a radiate from a hub 31, which is also made of a magnetic barrier material, to a circular edge 31c, the polarity of adjacent magnets like that of magnets 29a being reversed to provide poles bordering edge 31c in alternating sequence. Pinion 30 is mounted along shaft 17 for planar alignment with rack segment 25 and is positioned so that interior edge 29c of band 29 and circular edge 31c of pinion 30 are out of contact with each other, the spacing being very slightly, such as, 0.010 to 0.020 inches.

All parts of gauge 10 will be made of a non-magnetic metal, plastic or the like. For example, casing 11 may be cast aluminium, which not only serves as a non-magnetic metal but is used in the prior art wherein transverse wall 12 protects the operator should Bourdon tube 20 rupture. The other parts, such as, rear closure plate 11c, shaft 17, support plate 18, fitting 19, Bourdon tube 20, linkage 21 and rack segment 25, are made of non-magnetic stainless steel, brass or the like metal alloys. To protect the magnetic operation of rack segment 25 and pinion 30 from exterior magnetic fields, the interior surfaces of the walls of the rear compartment having a lining 11c of magnetic barrier sheet material, such as the lead of sheets 29b and 31b. Magnets 29a and 31a are preferably ceramic but may be made of other suitable types, such as alnico 8, samarium cobalt 18 and the like.

The practical utility and operation of gauge 10 will now be apparent. Rack segment 25 through linkage 21 responds to movement of Bourdon tube free end 20a in the conventional well understood manner. When gauge 10 is assembled, linkage 21 will position rack segment 25 so that the lower end of arcuate band 29 aligns with pinion 30 to correspond to the relaxed minimum pressure position of Bourdon tube 20. The gauge assembly includes adjusting pinion 30 by rotation with respect to rack segment 25 whereby pointer 16 extends vertically downwardly to indicate an appropriate reading on dial 15 approximately as shown in FIG. 2. The alternate N and S poles located along interior edge 29c of arcuate band 29 will always attract an opposite S and N pole on circular edge 31c of pinion 30. This attraction between magnetic poles on pinion 30 and unlike poles in registered alignment on band 29 will cause pinion 30 to rotate in perfect unison with the rotation of rack segment 25 as driven by the action of Bourdon tube 20. Whereas, pinion 30 is initially mounted on shaft 17 to properly position pointer 16 with respect to dial 15, minor adjustment of rack segment 25 to achieve more accurate alignment of pointer 16 with dial 15 may be made by movement of pivot pin carrier 22b in slot 22a. Dial 15 may also be rotatable by suitable exterior means (not shown) as is practiced in the prior art to provide dial calibration.

By way of illustration, pinion 30 may have an overall diameter of about 0.3 inches with shaft 17 having a diameter of about 0.1 inches. This provides suitable dimensions for eight equally sized sector shaped magnets 31a to sequentially register with ten correspondingly sized magnets 29a on band 29. As seen in FIG. 2, when Bourdon tube free end 20a is in minimum pressure position, the second magnet from the lower end of magnets 29a on band 29 is the primary operative magnet with which a facing magnet 31a of opposite polarity on pinion 30 aligns, positioning pointer 16 at 6 o'clock, which conventionally is the minimum reading on dial 15. As the pressure rises in Bourdon tube 20 and free end 20a moves radially outwardly, rack segment 25, through linkage 21, is rotated clockwise on pin 24 which rotates pinion 30, shaft 17 and pointer 16 also in a clockwise direction as is conventional for reading pressure indications on dial 15. When Bourdon tube 20 is at substantially maximum pressure, rack segment 25 will be in an approximate extreme clockwise position so that the uppermost magnet on band 29 will operatively face pinion 30 which has been rotated approximately 360 degrees by the movement of rack segment 25 so that pointer 16 is again close to 6 o'clock.

The rack segment 25 and pinion 30 may be proportioned with respect to each other and the number of magnets 29a on band 29 increased for a pointer sweep in excess of 360 degrees between minimum and maximum Bourdon tube pressure responses and conventional means, well known in the art, may be used for a dial indication that pointer 16 is in the second revolution.

FIG. 4 illustrates a modified rack segment and pinion arrangement in which pinion 40 is located radially beyond the rack segment 35. Pinion 40, which is similar to pinion 30, has hub 41 with radial bar magnets 41a separated by sheets 41b. Rack segment 35 is similar to segment 25, having band 39 and bar magnets 39a separated by sheets 39b. The poles of magnets 41a at circular edge 41c operatively face the opposite poles of bar magnets 39a arranged along the exterior edge 39d of arcuate band 39 of rack segment 35 and a shim 39e is carried on the interior edge 39c of band 39.

In order to preserve the conventional clockwise rotation of pointer 16 for minimum to maximum readings on dial 15, Bourdon tube 20 is positioned so that free end 20a is located on the left side of the casing 11 as seen from the front when rack segmet 25 and pinion 30 are used, as shown in FIGS. 1 and 2, and, accordingly, the parts are reversed and located in the conventional manner on the right side of the casing when employing the modified arrangement of rack segment 35 and pinion 40.

The compactness of the positioning of pinion 30 in opening 28b in the form of the invention shown in FIGS. 2 and 3 solves the problem of providing sufficient magnetic force between magnets 29a and magnets 31a in smaller size gauges, for example, sizes no greater than 6 inches in diameter. This construction permits band 29 to be made as wide as required to accommodate longer magnets 29a to provide the necessary magnetic force for efficient and accurate operation. The modification shown in FIG. 4 becomes appropriate for gauges larger than about 6 inches in diameter, the choice being available to the manufacturer in accordance with its requirements.

The magnet and separating sheet assembly construction of rack segments 25 and 35 and pinions 30 and 40 may utilize adhesive or other bonding techniques or the parts may be encased in a suitable plastic by molding methods well known in the art.

The Bourdon gauge construction incorporating the magnetic movement amplifying mechanism herein disclosed is seen to achieve the several objects of the invention and to be well adapted to meet conditions of practical use. As various possible embodiments might be made of this invention, and as various changes might be made in the disclosed construction, it is to be understood that all matters herein set forth or shown in the accompanying drawings are to be interpreted as illustrative and not in a limiting sense.

What is claimed is:

1. A movement amplifying mechanism for converting a relatively short radial movement of the free end of a pressure gauge Bourdon tube to the rotary motion of a shaft on which a pointer is mounted for indicating pressure values on a circular dial, said movement amplifying mechanism comprising a rack segment pivotally mounted for acute angular movement and a pinion mounted on said shaft, a linkage connecting said Bourdon tube free end to said rack segment for pivoting the latter in response to said Bourdon tube free end movement, said rack segment having an arcuate band carrying magnetic means, said pinion having complementary magnetic means located for operative magnetic engagement with said rack segment magnetic means whereby pivotal rotation of said rack segment by said Bourdon tube free end movement rotates said pinion and shaft for predetermined pressure indication on said dial by said pointer.

2. The movement amplifying mechanism defined in claim 1 in which said pinion magnetic means comprises radially extending segment shaped permanent magnets terminating at a circular edge of the pinion, said arcuate band magnetic means comprising a plurality of permanent bar magnets arranged in parallel alignment with respective polar axes extending radially of the rack and transversely of the band, one of the poles of each of said magnets being located along a driving arcuate edge of said band which faces and drives said circular edge of said pinion, the polarity of adjacent magnets on both the pinion and arcuate band being reversed, the respective magnetic poles along said arcuate band driving edge and around said pinion circular edge being sized for registration with each other whereby the magnetic attraction between magnets of opposite poles facing each other on the respective edges results in said pinion rotation.

3. The movement amplifying mechanism defined in claim 2 in which a sheet of magnetic flux barrier material separates the adjacent magnets on both said arcuate band and said pinion.

4. The movement amplifying mechanism defined in claim 3 in which said pinion has a hub of magnetic flux barrier material from which said segment shaped magnets radiate.

5. The movement amplifying mechanism defined in claim 2 in which said rack segment is formed with an opening, said arcuate band and driving arcuate edge bordering said opening, and said pinion being located in said opening for operative magnetic engagement of said circular edge with said arcuate edge.

6. The movement amplifying mechanism defined in claim 5 in which said arcuate band has an exterior edge along which the other poles of the magnets of said band extend, and a cover of magnetic material extending along said exterior edge for directing and intensifying the magnetic flux of said magnets of the arcuate band toward the magnets of said pinion.

7. The movement of amplifying mechanism defined in claim 5 in which said pinion has an overall diameter on the order of 0.3 inches and said segment shaped magnets are eight in number.

8. The movement amplifying mechanism defined in claim 7 in which said magnets in said arcuate band exceed eight in number to provide 360 degree rotation of said pointer when said rack segment rotates between extremes of said acute angular movement.

9. The movement amplifying mechanism defined in claim 2 in which said driving arcuate edge and pinion circular edge are spaced from each other a distance between 0.010 and 0.20 inches.

10. The movement amplifying mechanism defined in claim 2 in which said driving arcuate edge is located along a circumferential edge of said rack segment and said pinion is located radially outwardly of said rack segment beyond said driving arcuate edge.

11. The movement amplifying mechanism defined in claim 2 in which said rack segment is formed with an opening, said arcuate band having an interior edge bordering said opening and an exterior edge serving as said driving edge, said pinion being located radially outwardly of said rack segment for operative magnetic engagement of said circular edge with said exterior driving edge, and a cover of magnetic material extending along said interior edge directing and intensifying the magnetic flux of said magnets of the arcuate band toward the magnets of said pinion.

12. A Bourdon tube pressure gauge comprising a tubular casing having a transverse wall dividing the casing into front and rear compartments, a Bourdon tube mounted at one end on said casing in said rear compartment and having an opposite free end adapted to move radially outwardly and inwardly a relatively short distance in response to pressure changes within said Bourdon tube, a movement amplifying mechanism located in said rear compartment for converting the relatively short radial movement of said Bourdon tube free end to the rotary motion of a shaft on which a pointer is mounted for indicating pressure values on a circular dial, said movement amplifying mechanism comprising a rack segment pivotally mounted for acute angular movement and a pinion mounted on said shaft, a linkage connecting said Bourdon tube free end to said rack segment for pivoting the latter in response to said Bourdon tube free end movement, said rack segment having an arcuate band carrying magnetic means, said pinion having complementary magnetic means located for operative magnetic engagement with said rack segment magnetic means whereby pivotal rotation of said rack segment by said Bourdon tube free end movement rotates said pinion and shaft for predetermined pressure indication on said dial by said pointer, a rear closure plate for said rear compartment mounted on said casing, said casing, Bourdon tube, rear closure plate, rack segment, linkage and shaft being made of a non-magnetic material, and said rear compartment having a lining of magnetic flux barrier material to isolate said arcuate band magnetic means and pinion complementary magnetic means from external magnetic interference.

13. The Bourdon tube pressure gauge defined in claim 12 in which said pinion magnetic means comprises radially extending segment shaped permanent magnets terminating at a circular edge of the pinion, said arcuate band magnetic means comprising a plurality of permanent bar magnets arranged in parallel alignment with respective polar axes extending radially of the rack and transversely of the band, one of the poles of each of said magnets being located along a driving arcuate edge of said band which faces and drives said circular edge of said pinion, the polarity of adjacent magnets on both the pinion and arcuate band being reversed, the respective magnetic poles along said arcuate band driving edge and around said pinion circular edge being sized for registration with each other whereby the magnetic attraction between magnets of opposite poles facing each other on the respective edges results in said pinion rotation, a sheet of magnetic flux barrier material separating the adjacent magnets on both said arcuate band and said pinion, and said pinion having a hub of magnetic flux barrier material from which said segment shaped magnets radiate.

14. The Bourdon tube pressure gauge defined in claim 13 in which said rack segment is formed with an opening, said arcuate band and driving arcuate edge bordering said opening, said pinion being located in said opening for operative magnetic engagement of said circular edge with said arcuate edge, and said arcuate band having an exterior edge along which the other poles of the magnets of said band extend, and a cover of magnetic material extending along said exterior edge for directing and intensifying the magnetic flux of said magnets of the arcuate band toward the magnets of said pinion.

15. The Bourdon tube pressure gauge defined in claim 12 in which said pinion magnetic means comprises radially extending segment shaped permanent magnets terminating at a circular edge of the pinion, said arcuate band magnetic means comprising a plurality of permanent bar magnets arranged in parallel alignment with respective polar axes extending radially of the rack and transversely of the band, one of the poles of each of said magnets being located along a driving arcuate edge of said band which faces and drives said circular edge of said pinion, the polarity of adjacent magnets on both the pinion and arcuate band being reversed, the respective magnetic poles along said arcuate band driving edge and around said pinion circular edge being sized for registration with each other whereby the magnetic attraction between magnets of opposite poles facing each other on the respective edges results in said pinion rotation, said driving arcuate edge being located along a circumferential edge of said rack segment, said pinion being located radially outwardly of said rack segment beyond said driving arcuate edge.

16. The Bourdon tube pressure gauge defined in claim 15 in which said rack segment is formed with an opening, said arcuate band having an interior edge bordering said opening, said driving arcuate edge being an exterior edge of said band, and a cover of magnetic material extending along said interior edge directing and intensifying the magnetic flux of said magnets of the arcuate band toward the magnets of said pinion.

* * * * *